Dec. 20, 1949  K. WILLIAMS  2,492,080
HAND BRAKE
Filed July 29, 1946  2 Sheets-Sheet 1

Inventor:
Keith Williams.
By George J. Haight
Atty.

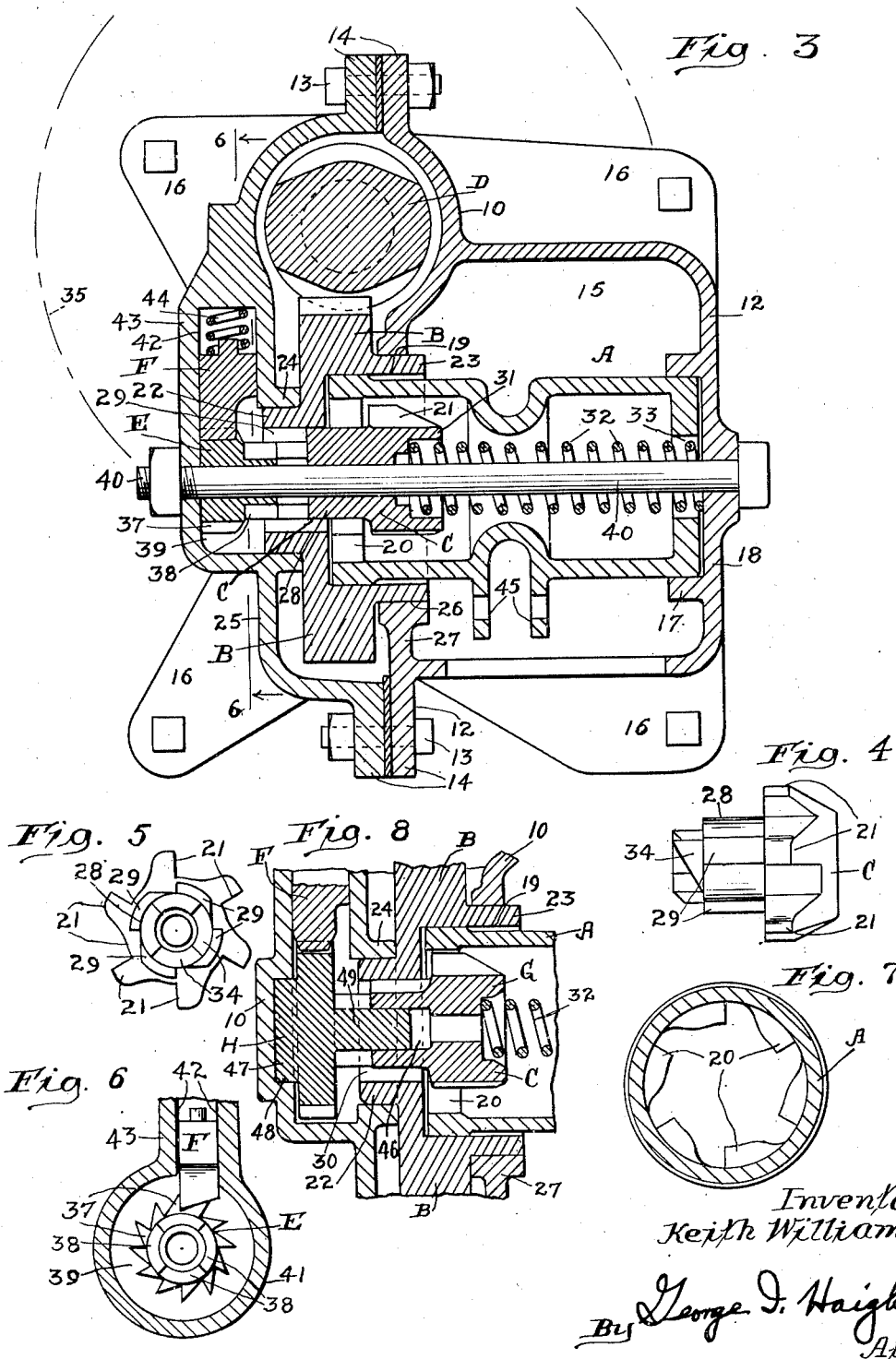

Patented Dec. 20, 1949

2,492,080

UNITED STATES PATENT OFFICE 2,492,080

HAND BRAKE

Keith Williams, Buffalo, N. Y.

Application July 29, 1946, Serial No. 686,815

8 Claims. (Cl. 74—505)

This invention relates to improvements in hand brakes.

One object of the invention is to provide a hand brake mechanism for railway cars, of simple and efficient design including a hand wheel, wherein the hand wheel serves both as means for actuating the mechanism of the brakes in chain-winding direction and as means for quickly releasing the brakes when rotated in chain-unwinding direction by disconnecting the winding means from the hand wheel with the result that backward rotation of the hand wheel is prevented in release of the brakes, thereby protecting the brakeman against injury.

A more specific object of the invention is to provide a hand brake mechanism comprising a chain-winding member and manually actuated means for driving the chain-winding member in both chain-winding and unwinding directions, wherein the driving means and the winding member are operatively connected by a releasable clutch element which is automatically shifted to disengaged position to release the brakes upon rotation of the drum in chain-unwinding direction through camming engagement of the clutch element with a cam member which is locked against rotation in chain-unwinding direction.

Other objects of the invention will more clearly appear from the description and claims hereinafter following.

In the accompanying drawings forming a part of this specification,

Fig. 3 is a view similar to Fig. 1, showing the clutch in released position;

Fig. 4 is a side elevational view of the clutch element of my improved mechanism;

Fig. 5 is an end elevational view of Fig. 4, looking from left to right in said figure;

Figure 6 is a vertical, sectional view, partially broken away, corresponding substantially to the line 6—6 of Fig. 3, showing the clutch-shifting cam member in elevation;

Fig. 7 is a transverse, vertical, sectional view through the left-hand end portion of the chain-winding drum of my improved mechanism, looking from right to left in Fig. 3; and Fig. 8 is a broken view, similar to Fig. 1, illustrating another embodiment of the invention.

Figure 1:
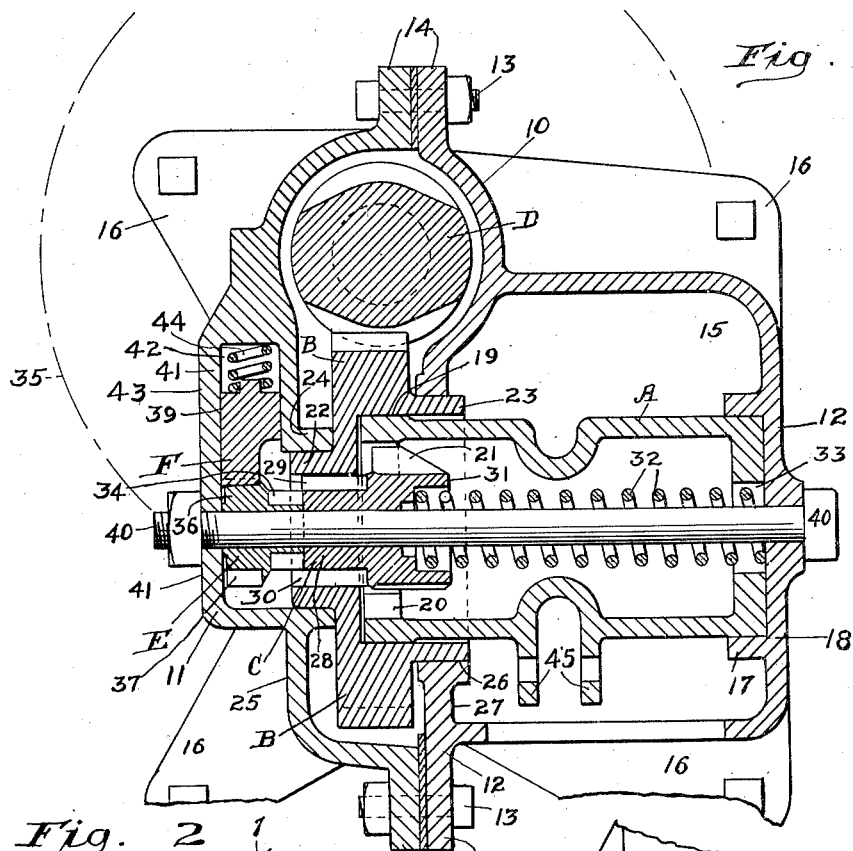
Fig. 1 is a vertical, sectional view of my improved hand brake mechanism, corresponding substantially to the line 1—1 of Fig. 2.
Figure 2:
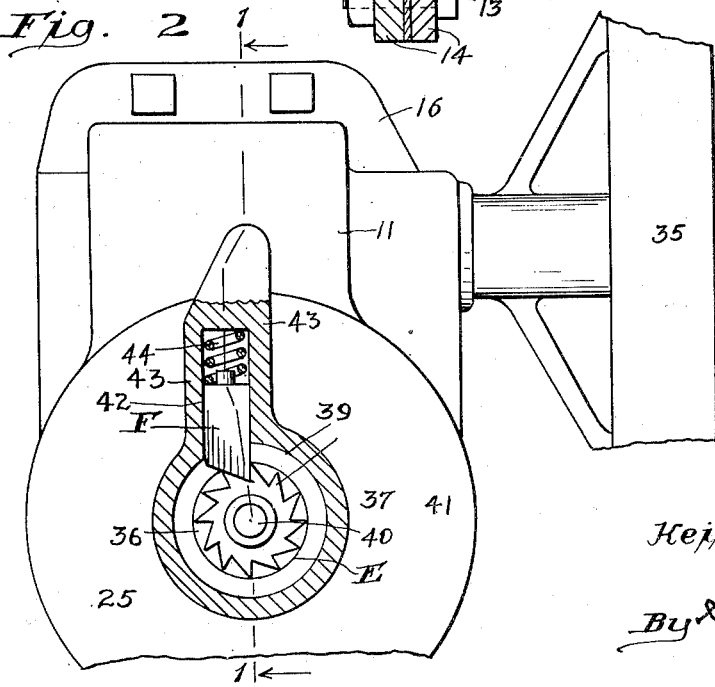
Fig. 2 is a side elevational view of Fig. 1, looking from left to right in said figure.

Referring first to the embodiment of the invention illustrated in Figs. 1 to 7 inclusive, my improved hand brake mechanism comprises broadly a chain-winding drum A; a worm wheel B; a sliding clutch element C operatively connecting the drum to the worm wheel; a worm D meshing with the worm wheel and actuated by the usual hand wheel of the brakes; a clutch-shifting cam member E; and a spring-pressed locking pawl F for holding the cam member against rotation to shift the clutch element.

As shown in the drawings, my improved hand brake mechanism is preferably enclosed in a two-part, vertically divided housing 10 comprising sections 11 and 12. Each section of the housing is in the form of a chamber. The sections 11 and 12 are secured to each other by bolts 13 extending through suitable flanges 14 on said sections. The back wall of the housing 10, which back wall is indicated by 15, is extended laterally outwardly of the housing proper to provide securing flanges or lugs 16 for mounting the mechanism on the end wall of a railway car.

The chain-winding drum A is rotatably mounted within the housing section 12, having the right-hand end thereof, as seen in Fig. 1, journaled in a bearing member 17 projecting from the inner side of the right-hand side wall 18 of the housing. The opposite end of the drum is supported by the worm wheel B, the latter being provided with a cylindrical bearing opening or seat 19 within which said end of the drum is journaled. As shown, the drum A is hollow and open at the left-hand end and has internal clutch teeth 20 at said open end which cooperate with clutch teeth 21 on the sliding clutch element C.

The worm wheel B has hollow hub portions 22 and 23 at opposite ends thereof by which it is supported, the hub portion 22 being journaled in a bearing member 24 on the inner side of the left-hand side wall 25 of the housing 10, as seen in Fig. 1, and the hub 23 being journaled in a bearing opening 26 provided in a vertical partition wall 27 formed on the section 12 of the housing and separating the chambers provided by the sections 11 and 12.

The clutch element C is slidingly supported by the worm wheel B and has rotation therewith, the same being provided with a shank portion 28 lengthwise slidable in the hollow hub portion 22 of the worm wheel and having lengthwise extending, peripheral teeth 29 engaged with cooperating interior teeth 30 on the hub 22. The clutch element C projects into the end of the drum A and has the clutch teeth 21, which are formed on the head portion 31 at said end, normally interlocked with the clutch teeth 20 of the drum. A spring 32, arranged within the drum A, has its opposite ends bearing on the clutch head 31 and the wall 18 of the housing 10, the right-hand end of the drum having a suitable opening 33 through which the spring extends. The spring 32 yieldingly holds the clutch element in position with the clutch teeth thereof engaged with the clutch teeth of the drum. A plurality of cam projections or teeth 34 are provided on the clutch element C at the outer or left-hand end thereof, as seen in Fig. 1 and as shown in detail in Fig. 4. These clutch projections are arranged in annular series and project from the end of the shank 28.

The worm D which meshes with the worm wheel B is arranged above the latter, being rotatably supported by suitable bearings (not shown) provided on the housing 10. The worm is rotated by the usual hand wheel 35, shown in Fig. 2 and indicated in dotted lines in Figs. 1 and 3.

The cam member E includes a heavy disclike ratchet wheel 36 having peripheral ratchet teeth 37. On the inner side thereof, the disclike ratchet wheel carries an annular series of cam projections or teeth 38, which are complementary to and correspond in number with the cam projections 34 of the clutch element C and cooperate therewith. The projections 34 and 38 have shouldered engagement with each other to effect rotation of the cam member E with the clutch element C when the parts are rotated in chain-winding direction, and the cooperating cam faces of these projections are inclined so that when the clutch element C is rotated in chain-unwinding direction with respect to the cam member, the clutch element will be shifted to the right from the position shown in Fig. 1 to the position shown in Fig. 3, thereby disengaging the clutch teeth 21 of the clutch element from the teeth 20 of the drum.

The cam member E is arranged in a chamber 39 provided on the outer side of the section 11 of the housing and is carried by a boltlike shaft member 40 supported in openings in the right-hand side wall 18 of the housing and the outer wall 41 of the chamber 39 and extends through aligned openings or bores in the cam member E and the clutch element C.

The locking pawl F for the cam member E is slidingly arranged above the ratchet wheel portion 36 of the latter, being guided for vertical movement in a guideway 42 formed by an upward extension 43 of the chamber 39. A spring 44, disposed within the upper portion of the guideway 42 and reacting between the upper closed end of the guideway and the pawl F, holds the latter yieldingly engaged with the teeth 37 of the cam member E.

The locking pawl F cooperates with the teeth 37 to hold the cam member against rotation in a direction corresponding to the unwinding direction of the winding drum and ratchets over these teeth when the cam member is rotated in chain-winding direction.

The operation of my improved hand brake mechanism, as shown in Figs. 1 to 7 inclusive, is as follows: To apply the brakes, the worm D is rotated in clockwise direction, as viewed in Fig. 1, thereby rotating the worm wheel in clockwise direction, as viewed from the left in said figure. The clutch element C being rotatable in unison with the worm wheel effects rotation of the drum through clutching engagement therewith to wind the brake chain thereon. As is well known to those skilled in this art, the brake chain, which is not shown in the drawings, has one end connected to the chain-anchoring lugs 45 of the drum and leads to the brake mechanism proper of the car. During the chain-winding operation, the cam member E is rotated in unison with the clutch element C through the interengaging cam projections 34 and 38, rotation thereof being in clockwise direction, as viewed in Fig. 2. At this time, the pawl F ratchets over the teeth 37 of the ratchet wheel portion of the member E. In effecting release of the brakes, the worm D is rotated in a direction reverse to the rotation thereof in winding the chain on the drum, thereby effecting rotation of the worm wheel B, clutch element C, and the drum A in reverse direction also. During this rotation of the parts in chain-unwinding direction, the cam member E is held against rotation by the locking pawl F and the cam projections 34 of the rotating clutch element C ride up on the cam projections 38 of the cam member, shifting the clutch element to the right from the position shown in Fig. 1 to the completely disengaged position shown in Fig. 3, thereby freeing the drum for rotation with respect to the other parts of the mechanism and allowing the chain to unwind without rotation of the hand wheel and other parts of the driving mechanism. As will be evident, the extent to which the brakes may be backed off or released by rotation of the hand wheel before complete quick release is obtained by free rotation of the drum, is dependent upon the number and pitch of the cooperating cam projections 34 and 38 provided on the clutch element and cam member. This cam means is preferably designed so that the amount of backward rotation of the hand wheel, which is permitted before quick release of the brakes is obtained, is sufficient to provide for the required backing off of the brakes to take care of the usual switching operations. Restoration of the clutch element C to the normal position shown in Fig. 1 is effected by the expansive action of the spring 32, the latter shifting the clutch element to its operative clutching position when the drum A comes to rest.

Referring next to the embodiment of the invention illustrated in Fig. 8, the brake mechanism is the same as that hereinbefore described with the exception that the cam member is differently mounted.

In Fig. 8, the chain-winding drum, worm wheel, and locking pawl are identical with the drum A, the worm wheel B, and the pawl F hereinbefore described in connection with Figs. 1 to 7 inclusive, and the same reference characters are employed to indicate these different members and the parts thereof. The clutch element, which is indicated by G in Fig. 8, is identical with the clutch element C hereinbefore described, with the exception that it is provided with a relatively large, axial, cylindrical bearing opening or seat 46 at the left-hand end thereof forming a support for a bearing projection on the cam member. The cam member, which is indicated by H in Fig. 8, is identical with the cam member E hereinbefore described, with the exception that it has a solid, cylindrical hub portion 47 at its outer side journaled in a bearing seat 48 provided in the corresponding side wall of the housing 10, and that it has a cylindrical hub portion 49 of smaller diameter at its inner side journaled in the bearing seat 46 of the clutch element G. As will be evident, the construction shown in Fig. 8 eliminates the supporting boltlike shaft 40 of the construction shown in Figs. 1 to 7 inclusive.

I claim:

1. In a hand brake mechanism, the combination with a rotary chain-winding member; of a rotary driving member; a sliding, shiftable clutch element separate from and rotatable with said driving member and having clutching engagement with said chain-winding member; a clutch shifting member rotatable in unison with said element in chain-winding direction; means for holding said shifting member against rotation during rotation of said element in chain-unwinding direction; and cooperating means on said clutch shifting member and clutch element for shifting the latter by rotation thereof in chain-unwinding direction to disengage said clutch element from the winding member.

2. In a hand brake mechanism, the combination with a rotary chain-winding member; of a rotary driving member; a sliding, shiftable clutch element rotatable with said driving member and having clutching engagement with said chain-winding member; a clutch shifting member rotatable in unison with said clutch element in chain-winding direction; latch means for holding said shifting member against rotation during rotation of said clutch element in chain-unwinding direction; and cooperating cam faces on said shifting member and said clutch element for shifting the latter by rotation thereof in chain-unwinding direction to disengage said clutch element from the winding member.

3. In a hand brake mechanism, the combination with a rotary chain-winding member; of a rotary driving member; a sliding, shiftable clutch element rotatable in unison with said driving member; interengaging clutch means on said clutch element and winding member; a ratchet wheel rotatable in unison with said element in chain-winding direction; a locking pawl having ratcheting engagement with said wheel when the latter is rotated in chain-winding direction and locking engagement therewith to hold the same against rotation in chain-unwinding direction; and cooperating cam projections on said ratchet wheel and clutch element for shifting the latter by rotation of said element in chain-unwinding direction to disengage said clutch means.

4. In a hand brake mechanism, the combination with a rotary chain-winding member provided with clutch teeth; of a rotary driving member; a sliding, shiftable clutch element rotatable in unison with said driving member, said clutch element having clutch teeth engageable with the teeth of the winding member to rotate the latter; a ratchet wheel rotatable in unison with said members and clutch element in chain-winding direction; a locking pawl for holding said ratchet wheel against rotation during rotation of said members and clutch element in chain-unwinding direction; and cooperating cam projections on said ratchet wheel and said clutch element for shifting the latter by rotation thereof in chain-unwinding direction to disengage the clutch teeth thereof from the clutch teeth of the chain-winding member.

5. In a hand brake mechanism, the combination with a rotary chain-winding drum; of a rotary driving member coaxial with said drum; a sliding, shiftable clutch element rotatable in unison with said driving member and coaxial therewith; cooperating clutch teeth on said element and winding drum; a ratchet wheel rotatable in unison with said clutch element in chain-winding direction; and cooperating cam projections on said clutch element and ratchet wheel for shifting the clutch element by rotation thereof in chain-unwinding direction to disengage said clutch teeth.

6. In a hand brake mechanism, the combination with a worm gear; of a clutch element slidable axially of said gear and rotatable in unison therewith, said element having clutch teeth thereon; a worm member for driving said worm gear; a rotatable chain-winding drum coaxial with said gear, said drum having internal clutch teeth normally operatively engaged by the teeth of said element to connect the drum to the worm gear for rotation therewith; a rotatable ratchet wheel coaxial with said worm gear; a locking pawl for locking the ratchet wheel against rotation in chain-unwinding direction; and interengaging cam projections on said clutch element and ratchet wheel having shouldered engagement with each other to effect rotation of said ratchet wheel in unison with said drum, gear, and clutch element in chain-winding direction and having camming engagement with each other for shifting said clutch element axially with respect to the drum to disengage the clutch teeth from each other when the drum, gear, and clutch element are rotated in chain-unwinding direction.

7. In a hand brake mechanism, the combination with a rotary chain-winding drum; of a rotary worm wheel; a hand wheel actuated, rotary worm member meshing with said worm wheel; a sliding clutch element connected to the worm wheel for rotation in unison therewith, said clutch element having clutching engagement with said drum; a rotatable clutch shifting member having peripheral ratchet teeth; cooperating cam projections on said clutch shifting member and clutch element interlocked with each other during rotation of said clutch element, worm wheel, and drum in chain-winding direction; and ratchet means engaging the teeth of said clutch shifting member for locking the latter against rotation in chain-unwinding direction, said cam projections of the clutch shifting member and clutch element having cooperating cam faces having camming engagement with each other upon rotation of said clutch element with respect to said clutch shifting member in chain-unwinding direction to force said clutch element out of clutching engagement with respect to said drum.

8. In a hand brake mechanism, the combination with a rotary chain-winding drum; of a worm gear coaxial with said drum; a releasable clutch member slidable coaxially of said gear and drum and normally operatively connecting the same for rotation in unison; a worm member for driving said worm gear; a rotatable shifting member coaxial with said releasable clutch member; means for holding said shifting member against rotation in chain-unwinding direction; and cooperating cam means on said clutch member and shifting member for shifting the clutch member axially to release the same when said worm gear and clutch member are rotated in chain-unwinding direction with respect to said shifting member.

KEITH WILLIAMS.

REFERENCES CITED

The following references are of record in the file of this patent:

UNITED STATES PATENTS

| Number | Name | Date |
| --- | --- | --- |
| 1,859,701 | Haseltine | May 24, 1932 |
| 1,909,952 | Haseltine | May 23, 1933 |
| 2,090,757 | Heitner | Aug. 24, 1937 |

FOREIGN PATENTS

| Number | Country | Date |
| --- | --- | --- |
| 667,356 | France | June 10, 1929 |